Aug. 16, 1966 A. M. RICHARD 3,267,444

MAGNETIC CORE CIRCUITS FOR BINARY CODED INFORMATION

Original Filed July 15, 1957

Inventor:
Andre M. Richard
By Kenyon, Palmer,
Stewart & Estabrook
Attorneys

United States Patent Office 3,267,444

Patented August 16, 1966

3,267,444

MAGNETIC CORE CIRCUITS FOR BINARY CODED INFORMATION

Andre Michael Richard, Paris, France, assignor to Societe d'Electronique et d'Automatisme, Courbevoie, France Original application July 15, 1957, Ser. No. 671,854, now Patent No. 3,058,098, dated Oct. 9, 1962. Divided and this application Sept. 13, 1962, Ser. No. 223,445
Claims priority, application France, July 21, 1956, 719,080, Patent 1,156,488
5 Claims. (Cl. 340—174)

This application is a division of co-pending application Serial No. 671,854, now Patent No. 3,058,098, filed jointly by me and others on July 15, 1957. The present application is concerned with the subject matter of FIGURES 1 to 3 of the earlier application.

The present invention is concerned with improvements in or relating to magnetic core circuits for handling binary coded informations through temporary registrations of the digits thereof on the said cores and repeatedly controlled progressions of these registrations along at least one cascade arrangement of the said cores in the said circuits. Usually, each core is made of a material which presents a substantially rectangular hysteresis cycle so that two stable conditions of reverse states of magnetization may be obtained and may serve for the representation of the binary digital values 0 and 1, according to a predetermined correspondence established between the said two states of magnetization and the said two digital values. As will be apparent later on, the said correspondence may vary according to a known law throughout the said cascade arrangement of magnetic cores. Each core is provided with at least one write-in winding and one read-out winding and interconnecting networks are provided between write-in windings and read-out windings of the cores for obtaining the said cascade arrangement along which a progression of a binary code may be suitably controlled. Each write-in winding of a core may receive a write-in current which, when of a special character with respect to the previous state of magnetization of the concerned core, may change this state of magnetization. Each read-out winding may carry a current which is of a character representative of the state of magnetization previously acquired by the concerned core.

The present invention is mainly concerned with an improved arrangement of interconnecting networks in a magnetic core circuit of the above-specified kind for a more simple and efficient control of the handling of binary coded informations therewith.

According to a feature of the invention, in a magnetic core circuit of the above-specified kind, each interconnecting network is active and comprises a pair of terminals for the application thereto of a two-polarity waveform control voltage, at least one read-out winding of a magnetic core with one end thereof connected to one of the said terminals, at least one write-in winding of a further magnetic core with one end thereof connected to the other one of the said terminals, the number of turns of the said write-in winding being lower than the number of turns of the said read-out winding, and a unidirectionally conducting element completing a serial connection between the said two windings and the said pair of terminals, all the unidirectionally conducting elements being of the same direction of insertion in the said interconnecting networks but the said control voltages being of regularly opposed phases in the application thereof to the successive interconnecting networks of the said magnetic core circuit.

The invention will now be detailed with reference to the accompanying drawings, wherein.

Figure 1:
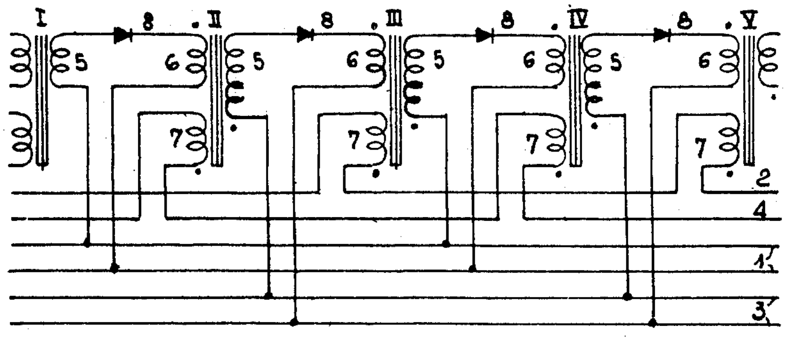
FIG. 1 shows an illustrative embodiment of a magnetic core circuit according to the invention.

FIG. 1 shows a part of a cascade arrangement comprising five magnetic cores, I to V, each one of which is made of a material having a substantially rectangular hysteresis cycle. Each core is provided, in this embodiment, with three windings viz a write-in winding 6, a read-out winding 5 and a special winding 7. The write-in or input winding 6 is for instance of $n_2$ turns and the read-out or output winding 5 of $n_1$ turns, with $n_2$ lower than $n_1$. The winding 7 will be used as a resetting winding though it will be later disclosed how and in what conditions such a control winding may be dispensed with.

The digital value 1 will be represented by a definite condition $A_1$ of a magnetic core whereas the digital value 0 will be represented by the reverse condition $A_0$. With respect to the embodiment of FIG. 1, it will be assumed that the condition $A_1$ will be the positive remanent induction state P of a core, and the condition $A_0$ consequently the negative remanent induction state N of a core, though of course the reverse may be considered as well.

Each read-out winding 5 of a magnetic core is serially connected with the write-in winding 6 of the next following core in the sequence and this serial connection includes a unidirectionally conducting element 8 and a voltage source. The point of insertion of the element 8 in the said serial connection may be at any desired location.

The voltage terminals of the networks interconnecting the cores I–II and III–IV are branched off leads from circuit 1 supplying a first two-polarity waveform voltage, and the voltage terminals of the networks interconnecting the cores II–III and IV–V are branched off leads from circuit 3, supplying a second two-polarity waveform voltage.

The control windings 7 of alternate cores, such as the cores II and IV, are serially connected in a current circuit 4, and the windings 7 of the remaining cores III and V are serially connected in a current circuit 2. Of course, the winding 7 of the first core I is in the current circuit 2, though it is not shown.

Figure 3:
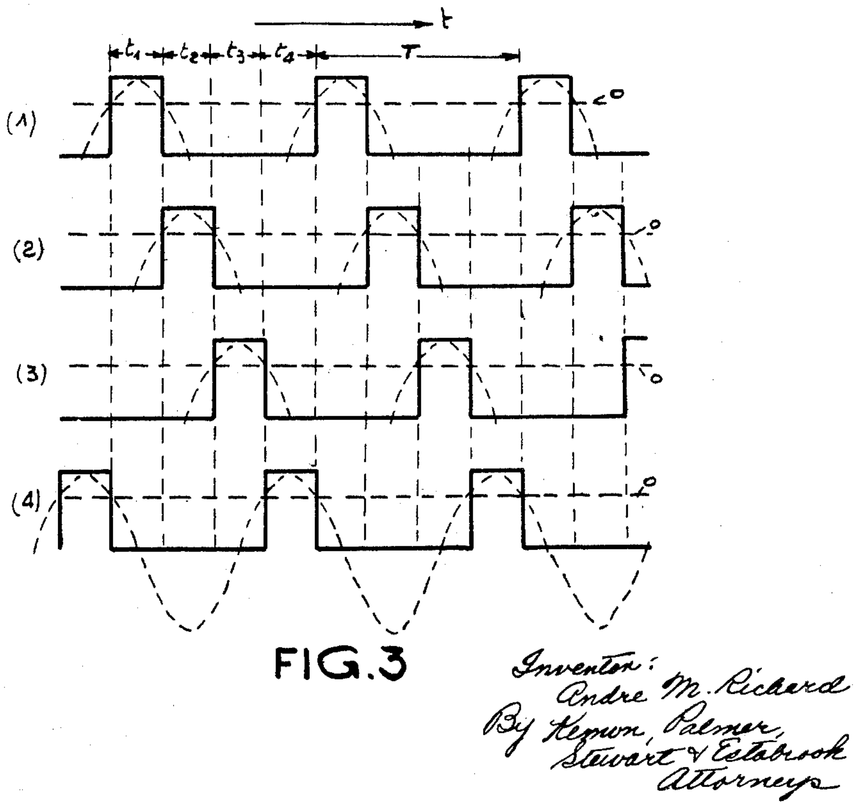
FIG. 3 shows the wave form and phase relations between the four control voltages of FIG. 1.

The voltage and current waveforms supplied by circuits 1 to 4 may be such as shown in FIG. 3, references 1 to 4. In any case, they are of two polarity and may be pure A.C. waveforms as indicated in dot lines. Lines marked 0 define the threshold level of action of the said waveforms in their positive actions upon the cores. It is more apparent when considering pure A.C. waveforms that 1 and 3 are in relative phase opposition therebetween and that 2 and 4 are in phase opposition therebetween, though a phaseshift of 90° exists between the pair 1, 3 and the pair 2, 4. The said currents and voltages act in four distinct sub-periods $t_1$, $t_2$, $t_3$ and $t_4$, constituting together the recurrence period T of operation of the device.

For explaining the operation of the arrangement of FIG. 1, it will be assumed that it starts from a time instant when cores I and III record the digital value 1 and cores II, IV and V, the digital value 0. Cores I and III are in their P magnetic condition, cores II, IV and V in their N condition.

On each core, windings 6 and 7 are wound in opposite directions; see the polarity dots in FIG. 1.

Core II has just been reset to its N condition by the positive alternation of current waveform 4 of FIG. 3 on the extreme left-hand side. The same alternation had no effect on core IV since, as core V is in the N condition, core IV has previously remained in the said N magnetic condition.

Starting with the sub-period $t_1$ of FIG. 3, the voltage applied cross 1 and consequently across the terminals of interconnecting networks between cores I–II, and cores III–IV, finds a substantially negligible impedance path offered to the development of transfer electrical current in each one of the windings 5 of cores I and III because the positive alternation of voltage 1 during $t_1$ magnetizes these cores beyond their P remanant condition to an over-saturated magnetic condition. Such a phenomenon of negligible impedance is quite known per se.

The value of the current, established in a direction such that it is transmitted through diodes 8 in these interconnecting circuits, is then solely determined by the impedance of the windings 6 of the receiver cores therein. This current value is, for instance, $i_c/n_2$, with $i_c$ the single-turn coercive current of any core and $n_2$, as said, the number of turns of any winding 6. It then actuates cores II and IV for changing their magnetic condition from N to P during this time interval $t_1$. At the end of such interval, all cores I to IV, inclusively, are in their P condition.

Figure 2:
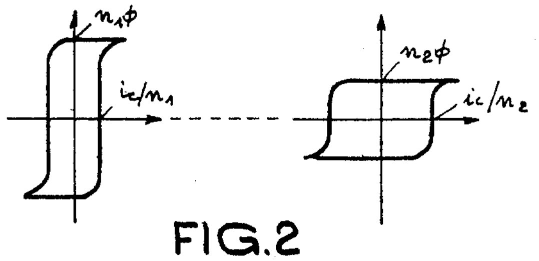
FIG. 2 shows the magnetic characteristic of the cores of FIG. 1 under certain conditions.

The cycle covered by the magnetic change of flux during $t_1$ in cores II and IV is shown in the right-hand part of FIG. 2.

As soon as a current starts to pass through the windings 5 of cores I and III a magnetization effect tends to develop in these cores, but this effect is opposed by the action of the current 4 in the windings 7 thereof, and further this effect would have been only that of a smaller current, $i_c/n_1$, where the number of turn $n_1$ of a winding 5 being, as said, several times greater than $n_2$. The security of operation is thus ensured.

Then occurs a period $t_2$ during which the current through the windings 7 of cores I and III, as shown at 2 in FIG. 3, acts for resetting both the cores I and III to their N magnetic condition. The unidirectionally conducting elements or diodes 8 which passed the first currents for the transfer of magnetic conditions from I to II and from III to IV do not pass the current induced by the resetting of cores I and III in their windings 5. At the end of $t_2$, cores I and III are in their N condition, cores II and IV are in their P condition. The registration has progressed by one step along the circuit.

During the third sub-period $t_3$ it is the interconnecting networks between cores II–III and cores IV–V which receive a suitable alternation from the supply leads 3, see FIG. 3, for enabling the passage of current through the diodes 8 of their interconnecting networks for the actuation of cores III and V from their N to their P conditions. The transfer is effected under the same conditions as for the transfer during $t_1$, but with a shift of cores. Consequently, at the end of sub-period $t_3$, cores II, III, IV and V are all in their P condition.

During $t_3$, core I may have received or not an information bit of value 1. Suppose it has not, so this core I has remained in its N condition.

During $t_4$, cores I and IV are reset to their N condition as was the case for I and III during $t_2$. Within each overall period T, obviously, each digit of the information has progressed by an effective step, the digit standing on core I at the beginning standing now on core III and the digit standing on core III at the beginning standing now on core V, the registration of each one of the digits obviously needing a pair of cores for correct representation and progression.

In a new period T, the first sub-period $t_1$ will bring core IV to the P condition and during sub-period $t_2$, core III will be reset to N. During $t_1$ core II will remain at the N condition as the current induced by the positive alternation of the voltage 1 in the windings 5 and 6 in the interconnecting circuit between I and II will be limited to a lower value since the impedance of 5 is not then negligible as this current tends to desaturate the core I and so forth.

During the resetting periods, the current is $i_c/n_1$ as shown in the left-hand part of FIG. 2.

I claim:

1. A device for handling binary coded information comprising at least one cascaded arrangement of magnetizable cores, each having a substantially rectangular hysteresis cycle of magnetization and having at least one write-in winding, and at least one read-out winding thereon, the write-in winding having a smaller number of turns than the read-out winding, said write-in and read-out windings on the said cores being wound to provide opposite directions of magnetization thereon, and a reset winding, a series network interconnecting each pair of adjacent cores and comprising in series circuit connection a read-out winding on one core, a unidirectional conducting device, a write-in winding of an adjacent core, and a source of alternating voltage; means connecting alternate ones of said network to receive alternating voltages of the same phase relation and the remaining networks to receive alternating voltages of opposite phase with respect to the voltages supplied to said alternate networks, and the unidirectionally conducting devices being similarly connected to conduct current in the same direction in all networks and through both windings of each network; and a source of resetting current supplying said reset windings in any interval between the active periods of write-in and read-out alternations of the said alternating voltage.

2. A device according to claim 1 wherein said reset winding on each core has a sufficient number of ampere-turns for inhibiting a resetting of the core by the read-out winding, said reset winding operating to reset the core due to a reversal of current therein between active write-in and read-out periods for the said cores.

3. A device for handling binary coded information comprising at least one cascaded arrangement of magnetizable cores, each core having a substantially rectangular hysteresis cycle of magnetization and having at least one write-in winding, and at least one read-out winding thereon, the write-in winding having a smaller number of turns than the read-out winding, and a reset winding, a series network interconnecting each pair of adjacent cores and comprising in series circuit connection a read-out winding on one core, a unidirectional conducting device, a write-in winding of an adjacent core, and a source of alternating voltage; means connecting alternate ones of said network to receive alternating voltages of the same phase relation and the remaining networks to receive alternating voltages of opposite phase with respect to the voltages supplied to said alternate networks, and the unidirectionally conducting devices being similarly connected to conduct current in the same direction in all networks and through both windings of each network; and a source of resetting current supplying said reset winding in any interval beteen the active periods of write-in and read-out alternations of the said alternating voltage.

4. A device according to claim 3 wherein the said reset winding on each core has a sufficient number of ampere-turns for inhibiting a resetting of the core by the read-out winding, and the said source of resetting current operating to ensure said inhibiting action during the read-out periods and to effect said resetting between active write-in and read-out periods for the said cores.

5. A device according to claim 3 wherein said source of alternating voltage and said source of resetting current are of identical frequencies and in quadrature phase relation.

No references cited.

BERNARD KONICK, *Primary Examiner.*

M. GITTES, *Assistant Examiner.*